UNITED STATES PATENT OFFICE.

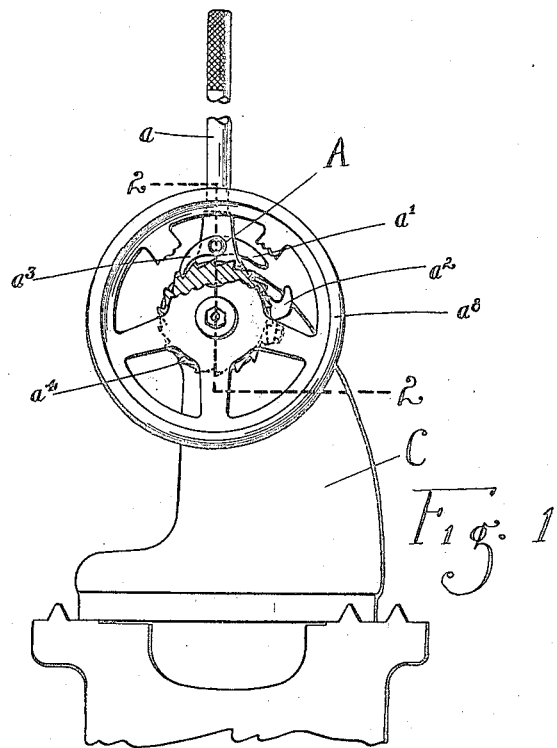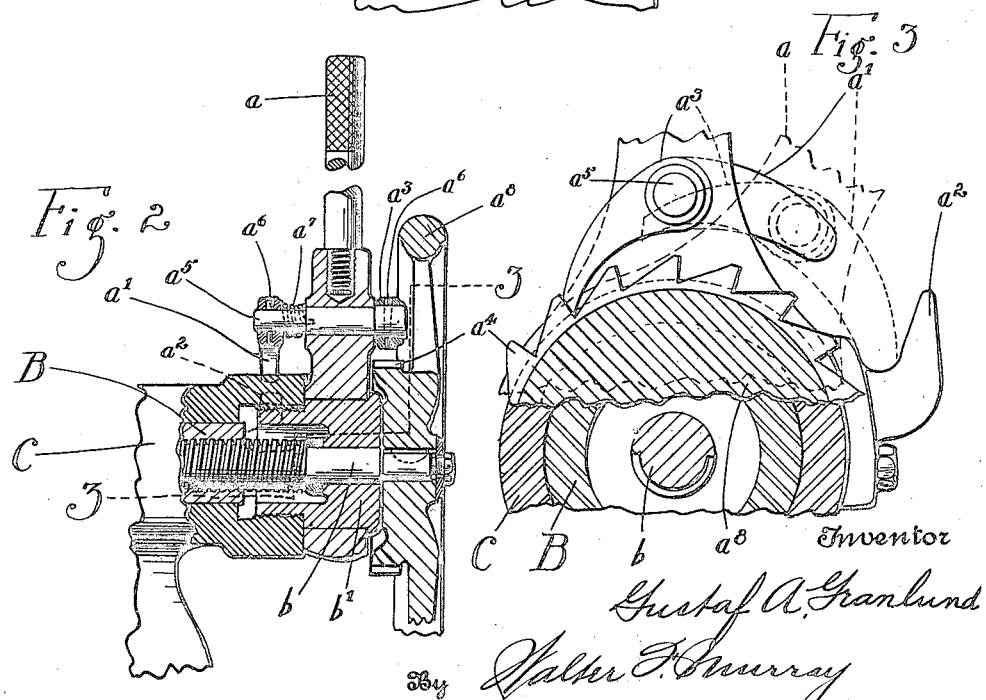

GUSTAF A. GRANLUND, OF CINCINNATI, OHIO, ASSIGNOR TO THE GREAVES-KLUSMAN TOOL COMPANY, OF CINCINNATI, OHIO, A CORPORATION OF OHIO.

RATCHET FEED MECHANISM.

1,425,007.   Specification of Letters Patent.   Patented Aug. 8, 1922.

Application filed June 21, 1920. Serial No. 390,377.

*To all whom it may concern:*

Be it known that I, GUSTAF A. GRANLUND, a citizen of the United States of America, and a resident of Cincinnati, in the county of Hamilton and State of Ohio, have invented a new and useful Improvement in Ratchet Feed Mechanism, of which the following is a specification.

An object of my invention is to provide a ratchet mechanism in which the pawl can be easily and quickly moved in and out of engagement with the ratchet wheel.

This and other objects are attained by the means described herein and disclosed in the accompanying drawing in which:

Fig. 1 is an end view of a device embodying my invention mounted upon a lathe tailstock, parts being broken away.

Fig. 2 is an enlarged sectional view on line 2—2 of Fig. 1.

Fig. 3 is an enlarged sectional view on line 3—3 of Fig. 2, parts being broken away.

My invention comprises the ratchet mechanism A that is adapted to advance a spindle B when the pull bar $a$ is moved toward the front of the machine or toward the operator. When the pull bar $a$ is moved backward to the rear of the vertical diameter of the spindle the pawl $a'$ is engaged by the cam $a^2$ thereby disengaging the pawl $a^3$ from the ratchet wheel $a^4$.

The ratchet mechanism A comprises the pull bar $a$, the head pawl $a^3$ and the tail pawl $a'$, both pawls are fixedly mounted on the shaft $a^5$ by means of the pins $a^6$. The spring $a^7$ is adapted to normally hold the edge of the head pawl in engagement with the ratchet wheel $a^4$ formed integral with the hand wheel $a^8$ mounted on and keyed to the spindle screw $b$. The pull bar is rotatably mounted upon the collar bearing $b'$ mounted upon the spindle screw $b$. A cam $a^2$ is mounted upon the tailstock casing C, and is adapted to engage the tail pawl $a'$ when the pull bar is moved to the rear of the vertical diameter of the spindle screw. The cam is adapted to move the pawl $a'$ so that the head pawl $a^3$ is disengaged from the ratchet wheel. When the head pawl is disengaged from the ratchet wheel, the wheel $a^8$ may be moved in a clockwise direction by turning the ratchet wheel $a^4$, by hand. The casing C also serves as a spindle housing, the spindle B engaging the spindle screw $b$.

The operation of my device is as follows:

For illustration suppose that a device embodying my invention is mounted upon a lathe tailstock, and a drill is secured in the spindle B with which a bore is being made upon a piece of work mounted upon the lathe chuck. The operator can easily advance the drill upon the work by alternately pulling the bar $a$ toward him and then moving it away to give a different bite to the head pawl or advancing the pawl upon the ratchet wheel. When the bore has been drilled the operator need only move the pull bar backward until the tail pawl engages the cam $a^2$ and the head pawl is disengaged from the ratchet wheel. The operator can then withdraw the drill from the bore by means of the hand wheel $a^8$. When the pull bar is moved toward the operator the cam disengages the tail pawl and spring $a^7$ moves the head pawl into engagement with the ratchet wheel. Normally the tail pawl does not engage the cam $a^2$.

Although I have shown and described my device as operative upon a lathe tailstock, it can be applied to many other machines.

What I claim is:

1. In a lathe feed mechanism the combination with a spindle housing, of a spindle screw extending into the housing, a pull bar rotatably mounted on the spindle screw, a ratchet wheel fixedly mounted upon the spindle screw, a head pawl on the pull bar, a tail pawl on the pull bar and attached to the head pawl, means to normally hold the head pawl in engagement with the ratchet wheel, and means on the housing adapted to be engaged by the tail pawl and to thereby disengage the head pawl from the ratchet wheel when the pull bar is moved beyond a normal limit.

2. In a lathe feed mechanism the combination with a spindle housing of a cam on the housing, a spindle screw, a ratchet wheel fixedly mounted on the spindle screw, a pull bar rotatably mounted on the spindle screw, a head pawl on the pull bar adapted to engage the ratchet wheel when in alignment with or in front of the vertical diameter of the spindle screw, and a tail pawl mounted on the bar and fixedly attached to the head pawl and adapted to engage the cam on the spindle housing when the pull bar is moved rearward beyond the vertical diameter of the spindle screw, thereby disengaging the head pawl from the ratchet wheel.

3. In a lathe feed mechanism the combination of a tail stock casing, a cam on the casing, a spindle reciprocally mounted in the tail stock casing having a threaded bore, a spindle screw engaging at one end in the threaded bore in the spindle, a collar bearing mounted on the casing having a bore in axial alignment with the bore in the spindle and through which the other end of the spindle screw extends, a hand wheel carrying a ratchet wheel mounted on the other end of the spindle screw, a pull bar rotatably mounted on the collar bearing having a bore having its axis in parallelism with the axis of the bore in the collar bearing, a shaft mounted rotatably in the bore in the pull bar, a head pawl on the shaft adapted to engage the ratchet wheel, a spring yieldingly retaining the head pawl in engagement upon the ratchet wheel, and a tail pawl mounted on the shaft adapted to engage the cam on the housing, the cam having a face adapted to move the head pawl against the yielding resistance of the spring, whereby the head pawl is disengaged from the wheel.

In witness whereof, I have hereunto subscribed my name this 18th day of June, 1920.

GUSTAF A. GRANLUND.